United States Patent [19]

Meunier

[11] Patent Number: 5,483,839
[45] Date of Patent: Jan. 16, 1996

[54] MULTI-PITOT TUBE ASSEMBLY

[75] Inventor: Robert Meunier, Portsmouth, R.I.

[73] Assignee: The United States of America as represented by the Secretary of the Navy, Washington, D.C.

[21] Appl. No.: 353,642

[22] Filed: Dec. 8, 1994

[51] Int. Cl.$^6$ .................................................. G01F 1/46
[52] U.S. Cl. .................................. 73/861.66; 73/861.65; 264/275; 264/271.1
[58] Field of Search ........................ 73/861.65, 861.66; 277/1, 11; 264/275, 277, 271.1

[56] References Cited

U.S. PATENT DOCUMENTS

| | | | |
|---|---|---|---|
| 1,645,449 | 10/1927 | Proebstel | 73/861.66 |
| 4,717,159 | 1/1988 | Alston et al. | 73/861.65 |
| 5,433,114 | 7/1995 | Cook et al. | 73/861.66 |

Primary Examiner—Richard Chilcot
Assistant Examiner—Harshad Patel
Attorney, Agent, or Firm—Michael J. McGowan; Prithvi C. Lall; Michael F. Oglo

[57] ABSTRACT

A multi-pitot tube assembly for use in flow measurements of a fluid surrounding a test structure. The assembly has multiple, identically shaped pre-formed pitot tubes sealed within a molded polyurethane fin shape. The pitot tubes are nested together and passed through an alignment disk into separate spread holes in a common sealing plug. The surface of the plug is shaped to conform to the surface of the test structure. The pitot tubes, alignment disk and plug are inserted into a mold and polyurethane is injected to seal the individual tubes and form the fin shape from which the pitot tubes extend. The mold is removed and the assembly is attached to the test structure with the fin extending into the medium and the sealing plug flush with the outer surface of the test structure. A watertight, O-ring seal is provided between the plug and the test structure.

17 Claims, 3 Drawing Sheets

MULTI-PITOT TUBE ASSEMBLY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

The present invention relates to an assembly of pitot tubes for use in turbulence measurements and more particularly to a multi-pitot tube assembly having a plurality of independent pitot tubes sealed in a common plug. The pitot tubes are pre-formed into a desired shape, nested together and passed through an alignment disk into separate spread holes in the common plug. The pitot tubes, alignment disk and plug are inserted into a mold and polyurethane is injected to seal the individual tubes. The polyurethane also forms a fin structure from which the pitot tubes extend for insertion into the flow stream. The plug is shaped to conform to the test platform to which the assembly is attached.

(2) Description of the Prior Art

The use of pitot tubes to measure static and dynamic pressures in a fluid medium is well known. Assemblies having multiple pitot tubes have been used in studying the dynamics of a wake caused by an object moving through a fluid such as water. In order to obtain a dynamic profile of the wake, the pitot tubes in these assemblies are normally stacked in a row extending perpendicularly from the moving object, with the row bending 90° into the wake. A fin structure is provided to minimize turbulence caused by the assembly. Such prior art assemblies are constructed by hand. The fin structure has a hollowed out cavity and is supported by a base attached to the object under study. Multiple pitot tubes are hand bent to fit around the fin structure, into the cavity, through the base and into the object. The cavity is sealed with an epoxy-type filler, which after hardening is sanded to match the shape of the fin. A half round fairing is attached to the fin structure using the same epoxy-type filler. Such prior art assemblies have several disadvantages. First, hand bending of the pitot tubes, sanding of the epoxy-type filler and attachment of the fairing are labor intensive operations making such assemblies expensive. Second, the attachment of the base to the object and the placement of the pitot tubes around the fin structure cause significant turbulence in the flow being measured. Thirdly, accomplishing a water-tight seal around the cavity and the pitot tubes, and between the base and the object is extremely difficult. Finally, such prior art assemblies suffer wide variations in the configuration of pitot tubes and fin shape due to hand assembly. These variations result in performance characteristics varying from one assembly to the next.

SUMMARY OF THE INVENTION

Accordingly, it is a general purpose and object of the present invention to provide a multi-pitot tube assembly which is assembled quickly and efficiently by eliminating hand bending of tubes and sanding of surfaces.

It is a further object that flow stream turbulence induced by the assembly be minimized.

Another object is that the assembly maintains a water-tight seal around the pitot tubes and between the assembly and the object to which it is mounted.

A still further object is that variations in performance characteristics be minimized from one assembly to the next.

These objects are accomplished with the present invention by providing multiple, identically shaped pre-formed pitot tubes sealed within a molded polyurethane fin shape. Molding the fin shape around the pitot tubes eliminates hand bending of the tubes and sanding of the fin structure allowing for faster assembly of the inventive device when compared to the prior art assembly. The ends of the pitot tubes extend through separate passages in a common sealing plug. The molded polyurethane surrounds each tube and provides a water-tight seal around each tube. The sealing plug is shaped to conform to the surface of the object under study and is sealingly attached thereto. The shape of the sealing plug and the embedment of the tubes within the fin minimize turbulence caused by the assembly. The use of preformed pitot tubes and a molded fin provides consistency between assemblies and minimizes performance variations.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein corresponding reference characters indicate corresponding parts throughout the several views of the drawings and wherein.

DESCRIPTION OF THE PREFERRED EMBODIMENT

Figure 1:
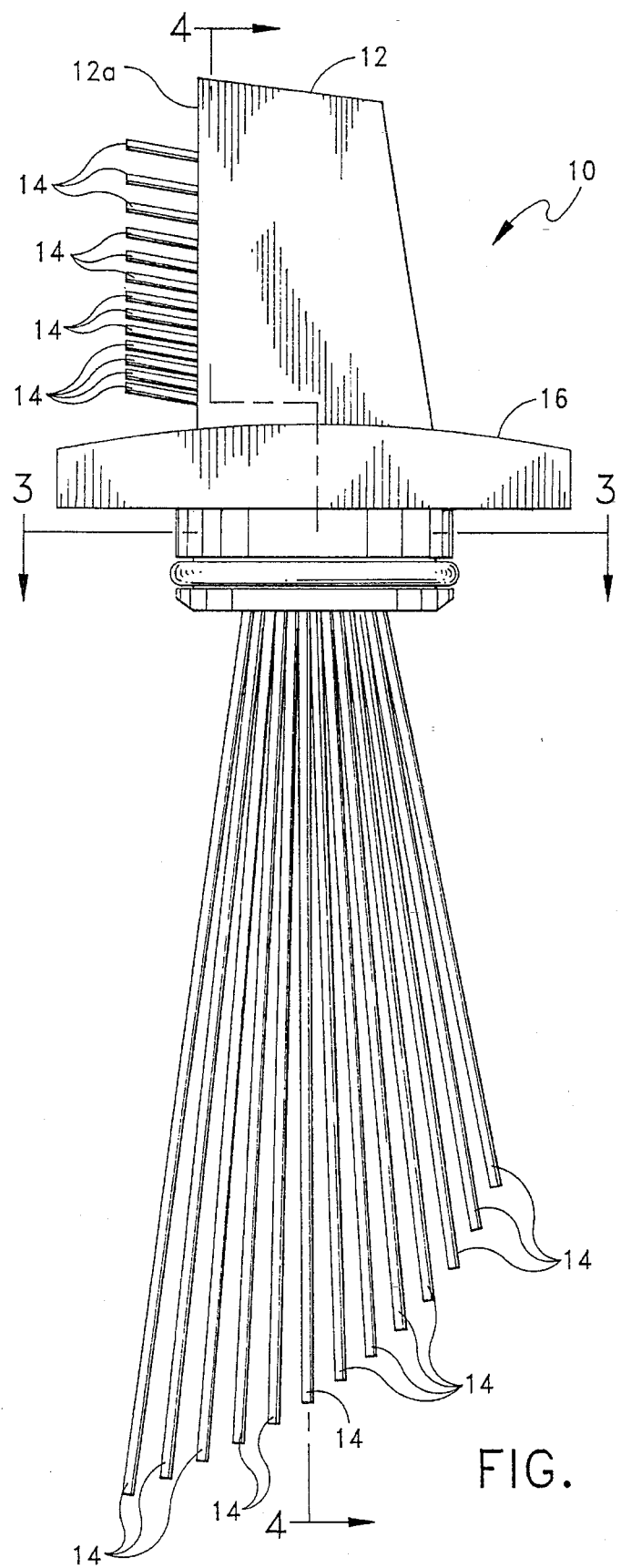
FIG. 1 is a side view of a multi-pitot tube assembly of the present invention.

Referring now to FIG. 1, there is shown a side view of a preferred embodiment of multi-pitot tube assembly 10. Assembly 10 includes a molded fin 12 having multiple pitot tubes 14 projecting from forward edge 12a of fin 12. Fin 12 is molded into sealing plug 16 such that tubes 14 extend through fin 12 and through sealing plug 16. Sealing plug 16 is adapted for attachment to a structure (not shown) such that fin 12 extends into the fluid medium under study and tubes 14 pass to the interior of the structure.

Figure 2:
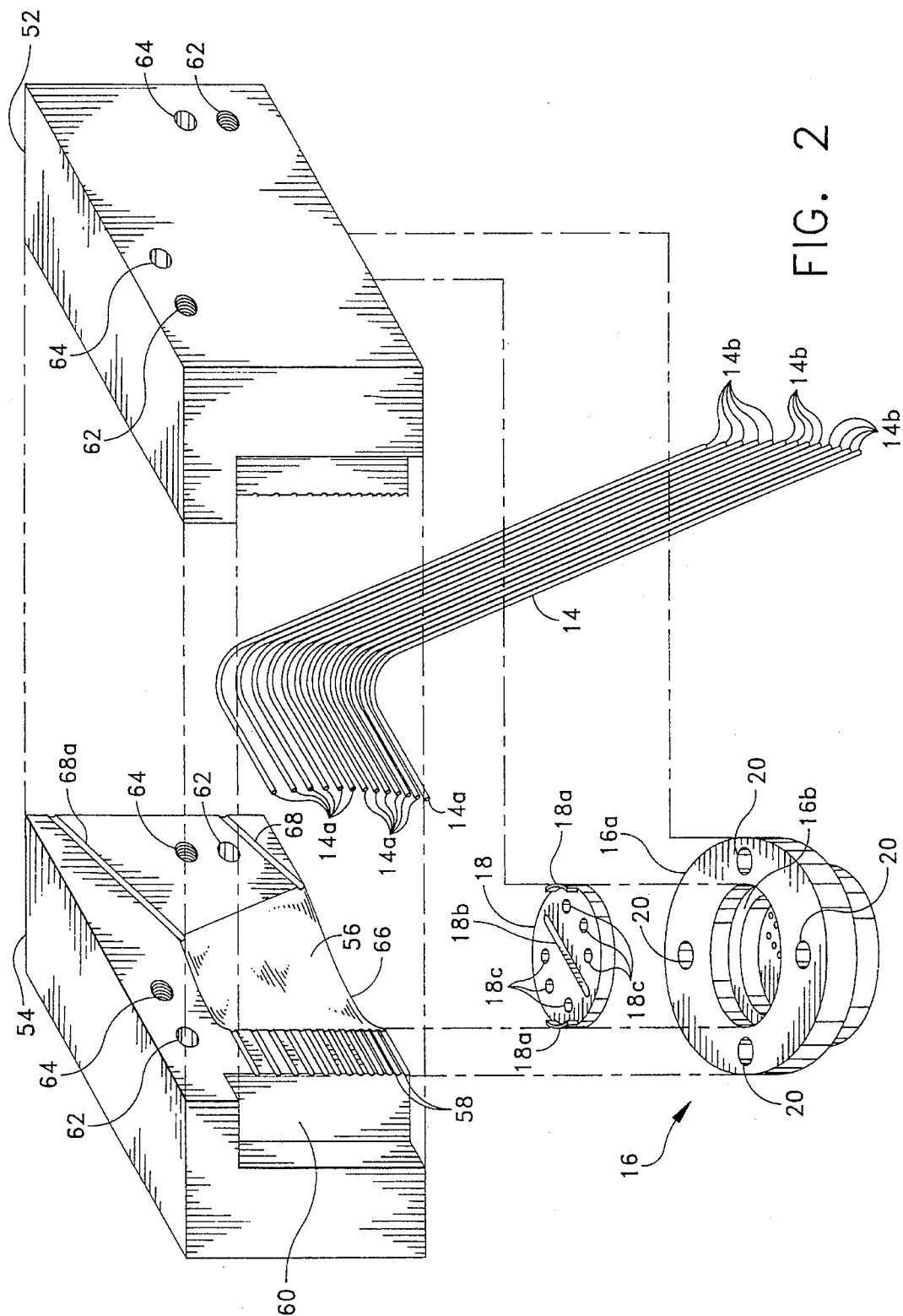
FIG. 2 is an expanded isometric view of a mold and components used in the fabrication method of the multi-pitot tube assembly of the present invention.

Referring now additionally to FIG. 2, there is shown an expanded isometric view of the fabrication method of the multi-pitot tube assembly of FIG. 1. Right molding block 52 and left molding block 54 are essentially mirror images of each other and the features described and indicated for left molding block 54 are mirrored in right molding block 52. Molding blocks 52 and 54 have a fin forming surface 56 shaped to form one side of fin 12. Semi-circular grooves 58 are cut into molding blocks 52 and 54 corresponding to the desired positions for pitot tubes 14 within forward edge 12a. Pitot tubes 14 are identically formed from tubing stock such as hypodermic tubing. Tubes 14 are positioned in grooves 58 with forward ends 14a protruding past cutting face 60 and having interior ends 14b aligned in a row. Right and left molding blocks 52 and 54 are fastened together by means of bolts (not shown) passing through bolt apertures 62 in one block and fastening to threaded apertures 64 in the other block. Alignment disk 18 has positioning tabs 18a which mate with corresponding positioning slots (not shown) in blocks 52 and 54. The alignment of interior tube ends 14b is maintained by passing tubes 14 through alignment slot 18b in alignment disk 18. Multiple apertures 18c in alignment disk 18 allow for passage of molding material for forming fin 12.

Plug 16 attaches to both blocks 52 and 54 by means of bolts (not shown) passing through apertures 20 and threading into blocks 52 and 54. Lower surface 66 of molding blocks 52 and 54 is shaped to conform to the shape of the structure to which plug 16 is attached. Annular upper portion 16a of plug 16 is similarly shaped. With plug 16 attached to blocks 52 and 54, alignment disk 18 abuts against annular seating surface 16b of plug 16.

Figure 3:
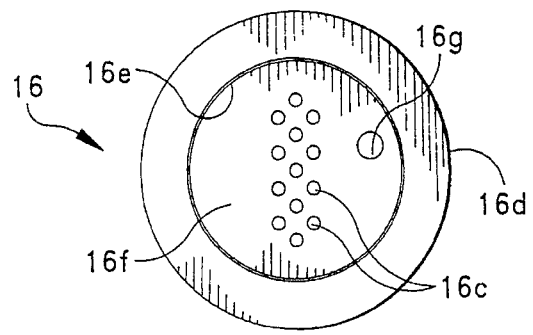
FIG. 3 is a cross-sectional view the sealing plug of the multi-pitot tube assembly of the present invention taken at 3—3 of FIG. 1.

Referring now additionally to FIG. 3, there is shown a cross-section of plug 16 taken at 3—3 of FIG. 1. Multiple spreading apertures 16c are provided in cylindrical base 16d of plug 16 for passage of tubes 14, each tube 14 passing through a separate spreading aperture 16c. Cylindrical surface 16e forms cavity 16f allowing tubes 14 sufficient space to spread from the aligned configuration of alignment slot 18b to the spread configuration of spreading apertures 16c. With blocks 52 and 54 attached to each other and additionally attached to plug 16, a molding material such as polyurethane is introduced through injection aperture 16g in base 16d. The molding material fills cavity 16f, passes through multiple apertures 18c in alignment disk 18 to fill the space between alignment disk 18 and lower surface 66 and further filling the space between fin forming surfaces 56. Vent apertures 68 are provided in molding blocks 52 and 54 for release of air as the molding material is introduced. Injection is completed when the molding material begins to flow from topmost vent aperture 68a. Prior to removing assembly 10 from molding blocks 52 and 54, forward ends 14a of pitot tubes 14 are cut along cutting face 60 such that all pitot tubes extend equally from fin 12.

Figure 4:
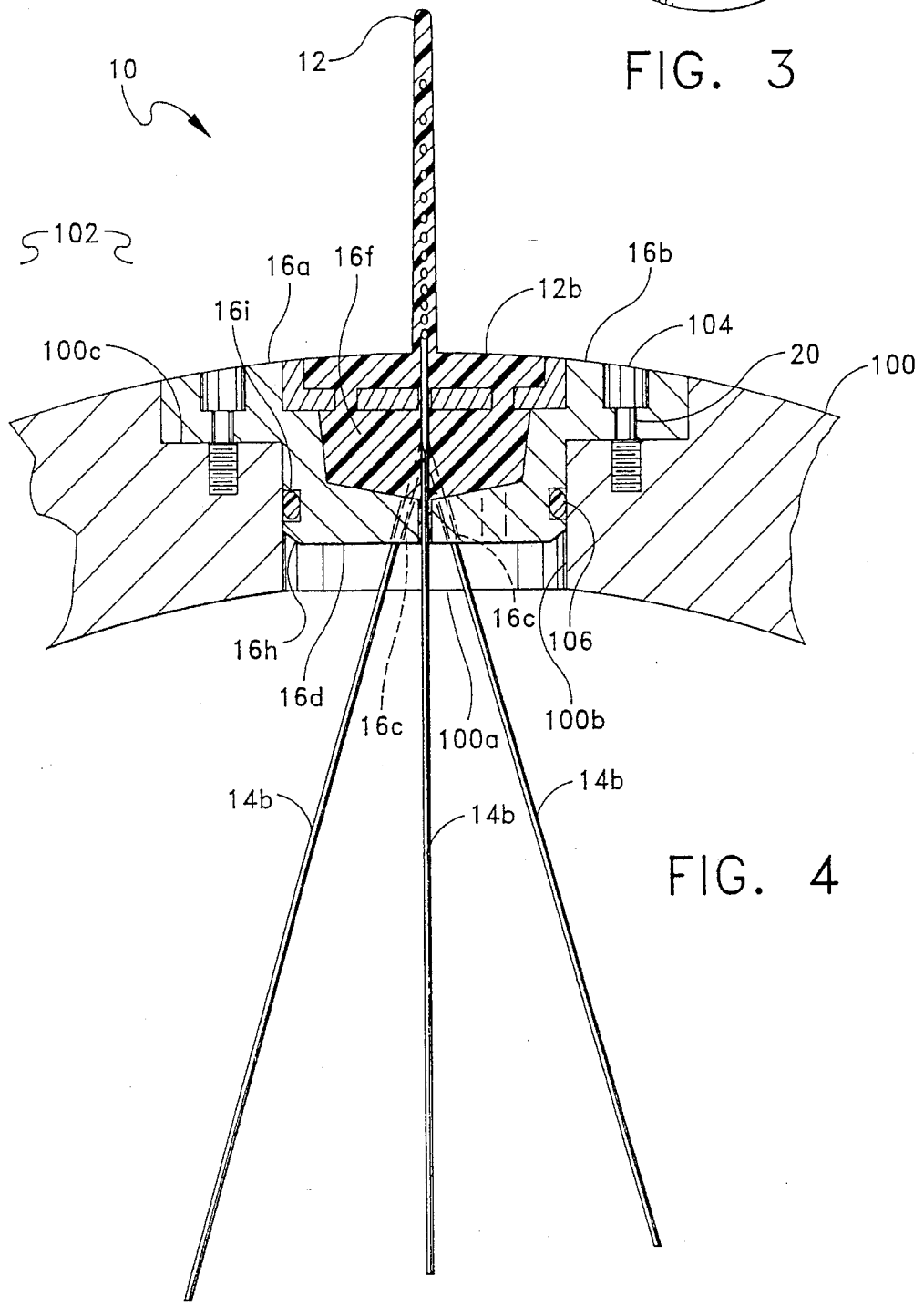
FIG. 4 is a cross-sectional view of the multi-pitot tube assembly of the present invention taken at 4—4 of FIG. 1.

Referring now to FIG. 4, there is shown a cross-section taken at a plane corresponding to 4—4 of FIG. 1 and showing multi-pitot tube assembly 10 attached to structure 100. Fin 12 extends from structure 100 into surrounding medium 102. Cylindrical pitot tube aperture 100a in structure 100 accepts base 16d. Chamfer 16h aids in aligning plug 16 with aperture 100a. Circumferential groove 16i is provided in cylindrical base 16d for accepting O-ring 106 with O-ring 106 providing a watertight seal between cylindrical base 16d and cylindrical wall 100b of pitot tube aperture 100a. Annular upper portion 16a of plug 16 abuts annular surface 100c and bolts 104 pass through apertures 20 in sealing plug 16 and thread into annular surface 100c to securely fasten plug 16 to structure 100. A hardened molding material forms fin 12, base 12b of fin 12, fills cavity 16f and surrounds tubes 14. The spreading of tubes 14 between alignment disk 18 and spreading apertures 16c is illustrated. Interior tube ends 14b are connected to instrumentation (not shown) within structure 100.

The assembly of the present invention has many advantages over the prior art. The use of identical, prefabricated hypodermic tubing for tubes 14 eliminates the need to hand bend each tube to conform to the fin shape. Grooves 58 allow for ease and efficiency in stacking tubes 14 and consistent spacing of tubes from one assembly to the next. The identical shapes of tubes 14 and the consistent spacing of tubes ensures that the performance characteristics of each assembly 10 are consistent with other assemblies. Embedding tubes 14 within fin 12 and providing base 12b and plug 16 with shapes conforming to that of structure 100 minimizes turbulence induced into medium 102 by the assembly. The spreading of tubes 14 and the use of molding material 108 to surround each tube 14 provides a water-tight seal for tubes 14 passing into structure 100. A water-tight seal between assembly 10 and structure 100 is provided by O-ring 106.

What has thus been described is a multi-pitot tube assembly for use in flow measurements adjacent to a structure. The assembly has multiple independent pitot tubes sealed in a plug attached to the structure. The pitot tubes are prefabricated into identical shapes and nested together to pass through the plug. The ends of the tubes are spread within the plug and a molding material surrounds the tubes to seal the passage of the tubes through the plug and into the structure. The stacked ends of the tubes extend into the medium surrounding the structure and are enclosed within a fin formed of the same material which seals the tubes. A short section of the tubes extend from the fin into the medium for obtaining measurements. The ends of the tubes extending within the structure are connected to suitable instrumentation for recording and analyzing data from the tubes.

Obviously many modifications and variations of the present invention may become apparent in light of the above teachings. For example, the configuration of the pitot tubes may be varied depending on the measurements to be taken. Further, the cross-sectional shape of the tubes and the measurement orifices in the tubes can be adjusted for the flow parameters being tested. The molding material may be any material which will flow into the mold and harden sufficiently to provide stiffness to the fin. The alignment disk and plug may be molded or machined of any suitable material. In the preferred embodiment, the alignment disk is molded of delrin and the plug is machined aluminum. The attachment of the plug to the structure may be varied to suit the conditions of the test. The assembly can be used to measure flow within a closed conduit by providing the molding blocks and plug surface with the appropriate shape.

In light of the above, it is therefore understood that within the scope of the appended claims, the invention may be practiced otherwise than as specifically described.

What is claimed is:

1. A multi-pitot tube assembly for obtaining flow measurements in a medium adjacent to a structure comprising:

an open, generally cylindrical base sealingly inset into a corresponding structure aperture in said structure;

a holding member formed of a moldable material, said moldable material filling a first portion of said base closest to said medium to fixedly attach a first end of said holding member to said base, said holding member having a second end extending into said medium, said second end of said holding member having a forward edge; and a plurality of pitot tubes passing within said holding member, said holding member maintaining said plurality of pitot tubes in fixed positions, said plurality of pitot tubes having a first end extending through said forward edge into said medium, said plurality of pitot tubes having a second end extending through said base, through said structure aperture and into said structure, said moldable material further filling the interstices between said plurality of pitot tubes, said moldable material sealing said pitot tubes within said holding member and further sealing said pitot tubes within said base.

2. A multi-pitot tube assembly according to claim 1 wherein:

said first ends of said plurality of pitot tubes are aligned in a row;

said base further comprises an alignment piece, said alignment piece being located within said first portion of said base, said alignment piece having an elongated aperture therethrough for maintaining said row alignment of said plurality of pitot tubes as said plurality of pitot tubes passes through said base.

3. A multi-pitot tube assembly according to claim 1 wherein said base further comprises a base portion furthest from said medium, said base portion forming a closed end of said cylindrical base, said base portion having a plurality of spreading apertures, each one of said plurality of pitot tubes passing through only one of said spreading apertures, said spreading apertures being spaced apart for allowing said moldable material to surround each one of said plurality of pitot tubes.

4. A multi-pitot tube assembly according to claim 3 wherein:

said first ends of said plurality of pitot tubes are aligned in a row;

said base further comprises an alignment piece, said alignment piece being located within said first portion of said base, said alignment piece having an elongated aperture therethrough for maintaining said row alignment of said plurality of pitot tubes as said plurality of pitot tubes passes through said base, said alignment piece further comprising at least one flow aperture for passage of said moldable material.

5. A multi-pitot tube assembly according to claim 4 wherein:

said forward edge of said holding member is generally perpendicular to said structure, said forward edge having a generally semi-circular cross-section in a first plane parallel to said structure;

said holding member further comprises a trailing edge, said trailing edge being generally perpendicular to said structure and generally aligned with said forward edge, said trailing edge coming to a point; and said holding member has a fin-shaped cross-section in said first plane, said fin-shaped cross-section varying smoothly from said forward edge semi-circular cross-section to said point of said trailing edge, said fin-shaped cross-section being symmetrical about a second plane generally perpendicular to said structure, said second plane passing through a centerline of said forward edge semi-circular cross-section and through said point of said trailing edge, said second plane further defining said row alignment of said plurality of pitot tubes.

6. A multi-pitot tube assembly according to claim 5 wherein said plurality of pitot tubes have identical tube shapes, said identical tube shapes comprising a generally 90 degree arc within said second plane, said arc further being within said holding member, said arc allowing said plurality of pitot tubes to pass through said base in a direction generally perpendicular to said structure.

7. A multi-pitot tube assembly according to claim 6 wherein said base further comprises an annular flange extending radially outward from said first portion of said base, said flange being inset into a corresponding annular depression in said structure, the annular depression having an annular base, said flange abutting and being fixedly attached thereto.

8. A multi-pitot tube assembly according to claim 7 wherein said base portion has a cylindrical exterior surface, said exterior surface having a groove circumscribing said exterior surface, said groove receiving an O-ring, said O-ring sealingly abutting an inner cylindrical surface of said structure aperture.

9. A multi-pitot tube assembly according to claim 8 wherein said annular flange has an upper surface, said upper surface shaped to conform to a shape of said structure adjacent to said annular flange.

10. A multi-pitot tube assembly according to claim 1 wherein:

said forward edge of said holding member is generally perpendicular to said structure, said forward edge having a generally semi-circular cross-section in a first plane parallel to said structure;

said holding member further comprises a trailing edge, said trailing edge being generally perpendicular to said structure and generally aligned with said forward edge, said trailing edge coming to a point; and said holding member further comprises a fin-shaped cross-section in said first plane, said fin-shaped cross-section varying smoothly from said forward edge semi-circular cross-section to said point of said trailing edge, said fin-shaped cross-section being symmetrical about a second plane generally perpendicular to said structure, said second plane passing through a centerline of said forward edge semi-circular cross-section and through said point of said trailing edge, said second plane further defining a row alignment of said plurality of pitot tubes.

11. A multi-pitot tube assembly according to claim 10 wherein said plurality of pitot tubes have identical tube shapes, said identical tube shapes comprising a generally 90 degree arc within said second plane, said arc further being within said holding member, said arc allowing said plurality of pitot tubes to pass through said base in a direction generally perpendicular to said structure.

12. A multi-pitot tube assembly according to claim 1 wherein said base further comprises an annular flange extending radially outward from said first portion of said base, said flange being inset into a corresponding annular depression in said structure, said depression encompassing said structure aperture, said depression having an annular base, said flange abutting and being fixedly attached thereto.

13. A multi-pitot tube assembly according to claim 12 wherein said base portion has a cylindrical exterior surface, said exterior surface having a groove circumscribing said exterior surface, said groove receiving an O-ring, said O-ring sealingly abutting an inner cylindrical surface of said structure aperture.

14. A multi-pitot tube assembly according to claim 9 wherein said plurality of pitot tubes are formed of stainless steel.

15. A multi-pitot tube assembly according to claim 9 wherein said moldable material is polyurethane.

16. A method of fabricating a multi-pitot tube assembly for obtaining flow measurements in a medium adjacent to a structure comprising the steps of:

providing a first mold and a second mold, said first and second molds having opposed matching depressions, said depressions together defining a shape of a holding member, said first and second molds further having opposed matching semi-circular grooves passing from a forward edge of said depressions to an exterior face of said molds, said molds further comprising molding vents extending from said depressions to an exterior face of said molds;

providing a plurality of pitot tubes;

preforming said plurality of pitot tubes;

placing each one of said plurality of pitot tubes into only one of said grooves;

bolting said first mold to said second mold such that each one of said tubes is enclosed within matching grooves in said first and second molds;

providing an alignment disk mating with said first and second molds, said alignment disk having a slotted aperture extending therethrough for passage of said plurality of pitot tubes, said slotted aperture being aligned with a base edge of said depressions, said alignment disk further having at least one flow aperture therethrough;

providing a sealing plug having a generally open cylindrical shape, said sealing plug having a first end with a flange extending radially outward from said first end, said flange encompassing said alignment disk, said sealing plug having a second closed end remote from said first end, said closed end having a plurality of spreading apertures extending therethrough, each one of said plurality of pitot tubes passing through only one of said plurality of spreading apertures, said spreading apertures being spaced apart for allowing a moldable material to surround each one of said plurality of pitot tubes, said closed end further having an injection aperture therethrough;

fixedly attaching said flange to said first and second molds, said flange forming a third mold portion;

injecting said moldable material into said injection aperture until said moldable material fills said sealing plug cylindrical open end, flows through said at least one flow aperture in said alignment disk, fills said depressions and flows through and out of said molding vents;

inserting a plug into said molding vents and into said injection aperture and allowing said moldable material to cure; and removing the first and second molds and trimming excess moldable material.

17. A method of fabricating a multi-pitot tube assembly in accordance with claim 16 further comprising the steps of:

cutting each one of said plurality of pitot tubes to a proper length, said length being determined by a cutting face on said first and second molds; and providing a circumferential O-ring seal around said closed end of said sealing plug, said O-ring being seated in a groove circumscribed around an exterior cylindrical surface of said closed end.

* * * * *